(12) United States Patent
Morrissey

(10) Patent No.: US 8,655,645 B1
(45) Date of Patent: Feb. 18, 2014

(54) SYSTEMS AND METHODS FOR TRANSLATION OF APPLICATION METADATA

(75) Inventor: Michael Morrissey, Atlanta, GA (US)

(73) Assignee: Google Inc., Mountain View, CA (US)

(*) Notice: Subject to any disclaimer, the term of this patent is extended or adjusted under 35 U.S.C. 154(b) by 304 days.

(21) Appl. No.: 13/104,638

(22) Filed: May 10, 2011

(51) Int. Cl.
*G06F 17/28* (2006.01)

(52) U.S. Cl.
USPC .................................................. 704/8

(58) Field of Classification Search
USPC ...................................... 704/1–10
See application file for complete search history.

(56) References Cited

U.S. PATENT DOCUMENTS

| | | | |
|---|---|---|---|
| 6,092,036 A * | 7/2000 | Hamann | 704/8 |
| 6,604,101 B1 | 8/2003 | Chan et al. | |
| 6,999,932 B1 * | 2/2006 | Zhou | 704/277 |
| 8,401,838 B2 * | 3/2013 | Fux et al. | 704/3 |
| 8,484,636 B2 * | 7/2013 | Mehta et al. | 717/176 |
| 2005/0177358 A1 * | 8/2005 | Melomed et al. | 704/2 |
| 2008/0077384 A1 * | 3/2008 | Agapi et al. | 704/2 |

* cited by examiner

*Primary Examiner* — Abul Azad
(74) *Attorney, Agent, or Firm* — McDonnell Boehnen Hulbert & Berghoff LLP

(57) ABSTRACT

A computer system includes a database module, a query module, a translation module, a search module, and a transmission module. The database module is configured to receive and store information associated with a plurality of items of digital media, such as applications, in a database. The information associated with the plurality of items of digital media is stored in a first language. The query module is configured to receive a search request in a second language different than the first language. The translation module is configured to translate the search request from the second language into the first language. The search module is configured to search the database using the translated search request to produce a set of search results responsive to the search request. The transmission module is configured to transmit the set of search results.

25 Claims, 6 Drawing Sheets

SYSTEMS AND METHODS FOR TRANSLATION OF APPLICATION METADATA

TECHNICAL FIELD

This description generally relates to translation of application metadata, such as metadata of applications included in markets that make applications available to users for download.

BACKGROUND

Many computer applications or computer programs are commercially available to users. For example, many people own mobile devices, such as smartphones, that are able to run computer applications.

Markets of computer applications or computer programs are readily available to users. Using such markets, users are able to search for and download such computer applications or programs directly to their computing device (such as a mobile device or a personal computer).

Many of the computer application or computer programs, however, are not available in more than a few languages. For example, many computer applications or computer programs are only available in the native language of the developer of a particular program. Additionally, many of the markets that distribute the computer application or computer programs are not fully functional to those who do not understand the language of the market or the computer application or computer programs distributed by a particular market. For example, a user who searches a market for an application using search terms in Spanish or Chinese might not be able to locate or recognize an application that is limited to English.

Accordingly, to facilitate the use of a market by users of different languages, there is a need for a system for translating the market information into other languages.

SUMMARY

According to one general aspect, a computer system including instructions recorded on a non-transitory computer-readable storage medium and readable by at least one processor may include a database module, a query module, a translation module, a search module, and a transmission module. The database module is configured to receive and store information associated with a plurality of items of digital media, such as applications, in a database. The information associated with the plurality of items of digital media is in a first language. The query module is configured to receive a search request in a second language different than the first language. The translation module is configured translate the search request from the second language into the first language. The search module is configured to search the database using the translated search request to produce a set of search results. The transmission module is configured to transmit the set of search results.

According to another general aspect, a computer system including instructions recorded on a non-transitory computer-readable storage medium and readable by at least one processor includes a receiver module, a translation module, a database module, a query module, a search module, and a transmission module. The receiver module is configured to receive information associated with each of a plurality of application. The information is associated with each of the plurality of applications is in a first language. The translation module is configured to translate the information associated with each of the plurality of applications from the first language to a second language different than the first language. The database module is configured to store the information associated with the plurality of applications in the first language in a database and to store the information associated with the plurality of applications in the second language in the database. The query module is configured to receive a search request in the second language. The search module is configured to search the database to produce a set of search results. The transmission module is configured to transmit the set of search results.

The details of one or more implementations are set forth in the accompanying drawings and the description below. Other features will be apparent from the description and drawings, and from the claims.

DETAILED DESCRIPTION

Figure 1:
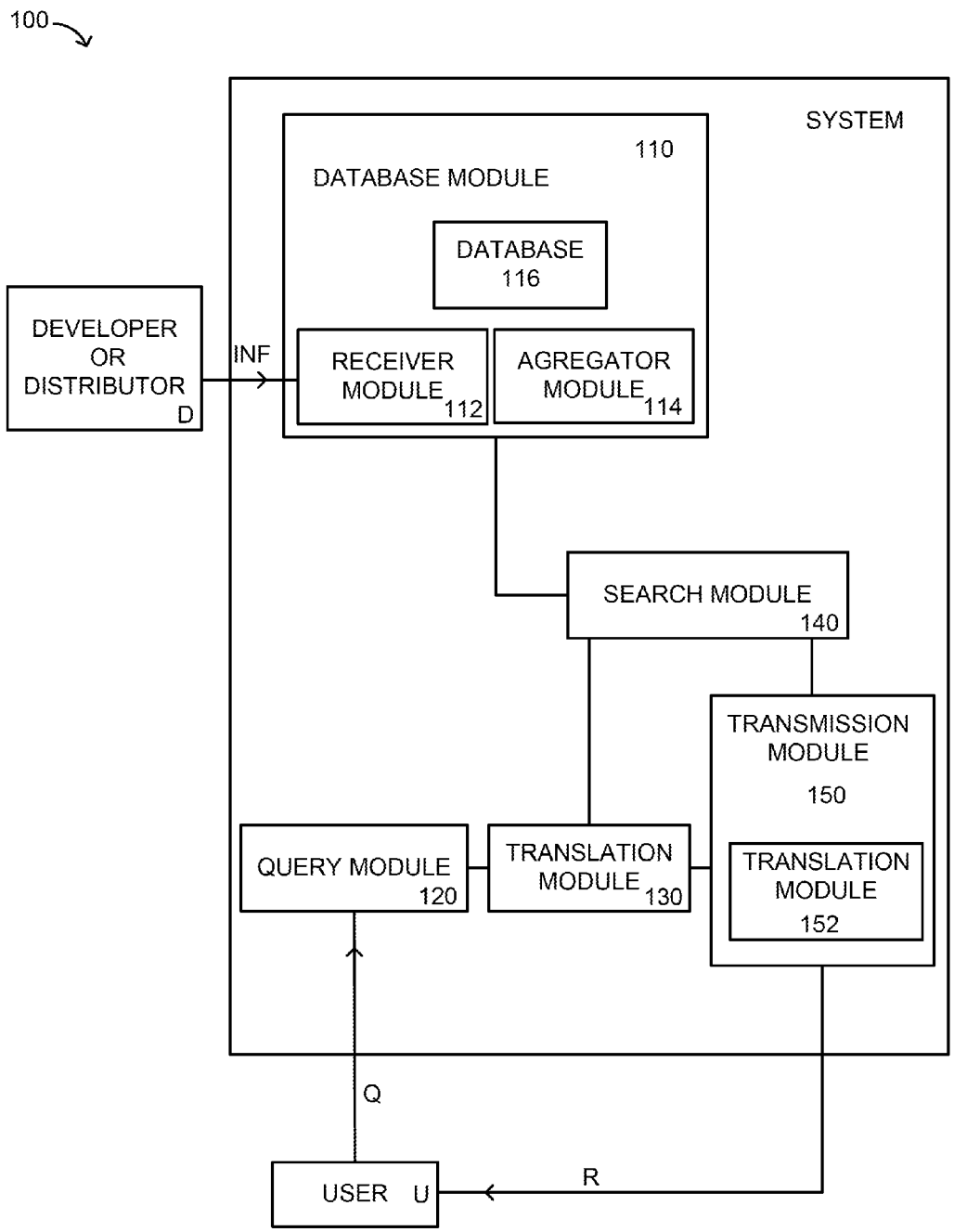
FIG. 1 is a block diagram of a system for providing an application market in multiple languages according to an implementation.

FIG. 1 is a block diagram of a computer system 100 for providing a market for digital media in a plurality of languages (including languages such as, but not limited to, French, Spanish, Japanese, and Chinese and languages associated with a particular location or local, such as, but not limited to, American English and British English). The digital media may be application or computer programs or any other type of digital media. For example, the computer system may provide a market for applications or computer programs in multiple languages. The system 100 may be used by users or consumers of a market to search for and locate any type of digital media such as computer applications or computer programs. For example, a user may search for and locate computer applications or computer programs or other digital media that might be useful or entertaining to the user. In some implementations, the user may download to a device (such as a handheld computing device or a personal computer) or otherwise acquire the desired digital media, such as a computer application or a computer program. For example, in some implementations, after searching for and locating a desired computer application or computer program, the user may pay a fee and download the computer application or computer program to a computing device controlled by the user. In some implementations, the computing device can be a handheld or mobile device such as a mobile phone. In other implementations, the computing device can be a personal computer.

In the illustrated implementation, a user may search for and locate digital media, such as computer applications or computer programs, in different languages. For example, in the illustrated implementation, a user may search for a computer application using key words in the native language of the user.

The system 100 may also be used by digital media providers, such as application and computer program developers, to provide digital media, such as applications and/or computer programs, to the system for future location by users of the system. Specifically, in some implementations, a developer of an application or a computer program may provide information regarding an application or a computer program to the system for storage or inclusion in a database for future reference and identification by a user of the system.

The system 100 includes a database module 110, a query module 120, a translation module 130, a search module 140, and a transmission module 150. In some implementations, one or more of the components or modules of the system 100 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed by a computer). For example, in some implementations, the query module 120 can be, or can include, a software module configured for execution by at least one processor (not shown). Similarly, the translation module 130 can be, or can include, a software module configured for execution by at least one processor (not shown). In some implementations, the functionality of the modules or components can be included in different modules and/or components than those shown in FIG. 1. For example, although not shown, the functionality of the search module 140 can be included in a different module than the search module 140, or can be divided into several different modules.

The database module 110 is configured to receive and store information associated with or regarding items of digital media, such as applications or computer programs. In some implementations, the database module 110 includes a database 116 (e.g., a remote database, a distributed database, a relational database) that is configured to index, store and organize information. In some implementations, the information stored by the database module 110 includes metadata or information about or regarding the specific items of digital media (applications or computer programs) such as a title of the application or computer program, a summary of the application or computer program, an abstract of the application or computer program, a version of the application or computer program, promotional language of the application or computer program and/or key words that describe the application or computer program. In other implementations, the information includes other information about or regarding the specific digital media (applications or computer programs).

In some implementations, the database module 110 stores the information about all of the specific items of digital media in a single language. For example in some implementations, the database module stores all of the information about all of the applications or computer programs in English. In other implementations, the database module 110 stores the information regarding the applications or computer programs in more than one language. For example, in some implementations, the database module 110 stores information about a specific application in more than one language. In other implementations, the database module 110 stores information about one application in a first language and stores information about a second application in a second language different than the first language.

In some implementations, the database module 110 may also store the items of digital media in their entirety. For example, in some implementations, the database module 110 may store the code or script of the applications or computer programs.

In the illustrated implementation, the database module 110 also includes a receiver module 112 and an aggregator module 114. The receiver module 112 is configured to receive the information associated with the applications or computer programs. For example, as illustrated in FIG. 1, in some implementations, the receiver module 112 is configured to receive the information associated with the applications or computer programs INF from a developer or distributor D of the applications or computer programs. In some implementations, the receiver module 112 is configured to receive the information from the developer or distributor D via a network connection, such as a local area network (LAN) or a wide area network (WAN), e.g., the Internet. In other implementations, the receiver module 112 is configured to receive the information from the developer or distributor via another mechanism.

The aggregator module 114 is configured to aggregate or add the information received by the receiver module 112 to the database or other storage mechanism of the database module 110.

The query module 120 of the system 100 is configured to receive a search request or query Q from a user U. For example, in some implementations, a user U may provide a search request or query Q to the query module 120 to receive a listing of applications or computer programs that may be of interest to the user.

In some implementations, the query module 120 is configured to receive the search request or query from a user U via a network connection, such as a local area network (LAN) or a wide area network (WAN), e.g., the Internet. In other implementations, the query module 120 is configured to receive the search request or query from the user U via another mechanism. For example, in some implementations, the query module 120 may interact with the user via a graphical user interface in which the user may input the search request or query Q.

For some implementations, the query module 120 is configured to receive the search request or query from the user in a language that is different than the language in which the information associated with the items of digital media, such as applications or computer programs, in the database module 110 is stored. For example, in some implementations, the user U may submit or otherwise provide the search request or query Q to the query module 120 in the native language of the user U even if the information stored in the database module 110 is in a language other than the native language of the user U.

The query module 120 is operatively coupled to the translation module 130. The translation model 130 is configured to translate the search request or query Q that is received from the user U from the language of the search request (e.g., the native language of the user) to the language in which the information associated with the applications or items of digital media is stored in the database module 110. For example, in some implementations, the translation module 130 is configured to translate a search request provided in any number of languages (such as Chinese, Japanese, German, Spanish, etc.) to the language of the database module 110 (such as English or the language of the developer or distributor of the application or computer program).

The translation module 130 is operatively coupled to the search module 140. The search module 140 is configured to search the database of the database module 110 based on the search request or query as it has been translated into the language in which the information associated with the applications, computer programs, or other digital media is stored within the database. The search module 140 is configured to produce a set of search results based on the search of the database 116 of the database module 110. For example, in some implementations, the information in the database 116 of the database module 110 may be indexed and then searched by the search module 140. For example, in some implementations, metadata, such as the titles, abstracts, summaries, or other information related to the applications, computer programs, or other items of digital media is indexed in the database 116 of the database module 110. Specifically, in some implementations, the search module 140 is configured to compare the search terms to the information indexed in the database 116.

In some implementations, the set of search results includes the information associated with the applications, computer programs or other digital media that is stored in the database. For example, the set of search results may include a title, an abstract, and/or a summary for each of the applications that are relevant to the search request or query.

The search module 140 is operatively coupled to the transmission module 150. The transmission module 150 is configured to transmit the set of search results produced by the search module 140 R to the user U. In some implementations, the transmission module 150 is configured to transmit the set of search results R to the user U via a network connection, such as a local area network (LAN) or a wide area network (WAN), e.g., the Internet. In other implementations, the transmission module 150 is configured to transmit the set of search results R to the user U via another mechanism.

In some implementations, the transmission module 150 is configured to transmit the set of search results to the user U in the native language of the user U (or in the language in which the user U provided the search request or query). For example, in some implementations, the transmission module includes a translation module 152 that is configured to translate the set of search results from the language of the database to the language of the user U. In other implementations, the translation module 150 is operatively coupled to the translation module 130. In such implementations, the translation module 130 is configured to translate the set of search results from the language of the database to the language of the user U.

In some implementations, the system 100 also functions as a market and is configured to sell or vend a particular application, computer product, or other item of digital media to the user. For example, in some implementations, the system 100 is configured to receive a selection of an application from a user, receive a fee from the user, and transmit or otherwise provide the application or computer program to the user. In some implementations, the system 100 is configured to track and store the sales or distribution information of the particular applications or computer programs.

Figure 2:
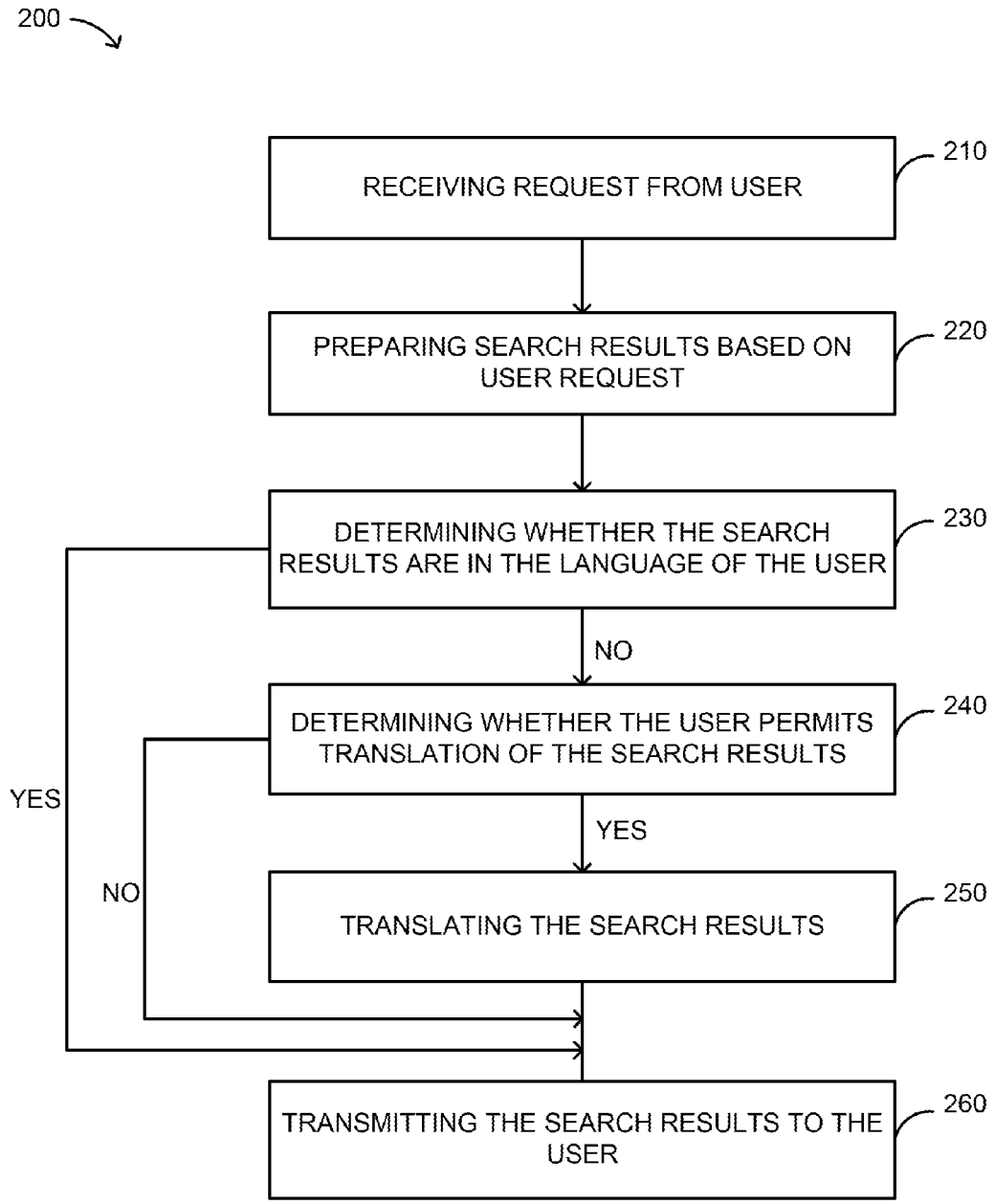
FIGS. 2 and 3 are flowcharts illustrating example operations of the system of FIG. 1.

FIG. 2 is a flow chart illustrating an exemplary method 200 of using the computer system 100. In some implementations, a computer program product is tangibly embodied on a computer-readable medium and includes instructions that, when executed, are configured to cause at least one processor to implement the method 200.

The method 200 includes at 210 receiving a query or a request from a user for digital media, such as applications or computer programs, that satisfy the query. At 220 search results responsive to the query are created. At 230, if the search results are in the language of the user (such as a native language of the user or a preferred language of the user), the search results are provided to the user. For example, in some implementations, a language recognition module is configured to identify the language of the search results. Specifically, in some implementations, the language recognition module may include a language identification mechanism. In other implementations, the language recognition module is configured to communicate with an outside or third-party language identification mechanism.

If the search results are not in the language of the user, then at 240, it is determined whether the user allows for the translation of the search results. For example, the search results may be in the language of the information of the database, which may be different than the language of the user. If the user does allow for the translation of the search results, then at 250, the search results are translated and at 260, the search results are provided to the user. If the user does not allow for the translation of the search results, then the translation is not performed and the raw search results are provided to the user.

In some implementations, a user may adjust or set a setting to indicate whether the user desires or allows for the translation of the search results. Additionally, in some implementations, the user may provide an indication of a preferred language of the user. In other implementations, a prompt or request may be provided to the user to allow the user to indicate whether the user desires that the search results be translated.

Figure 3:
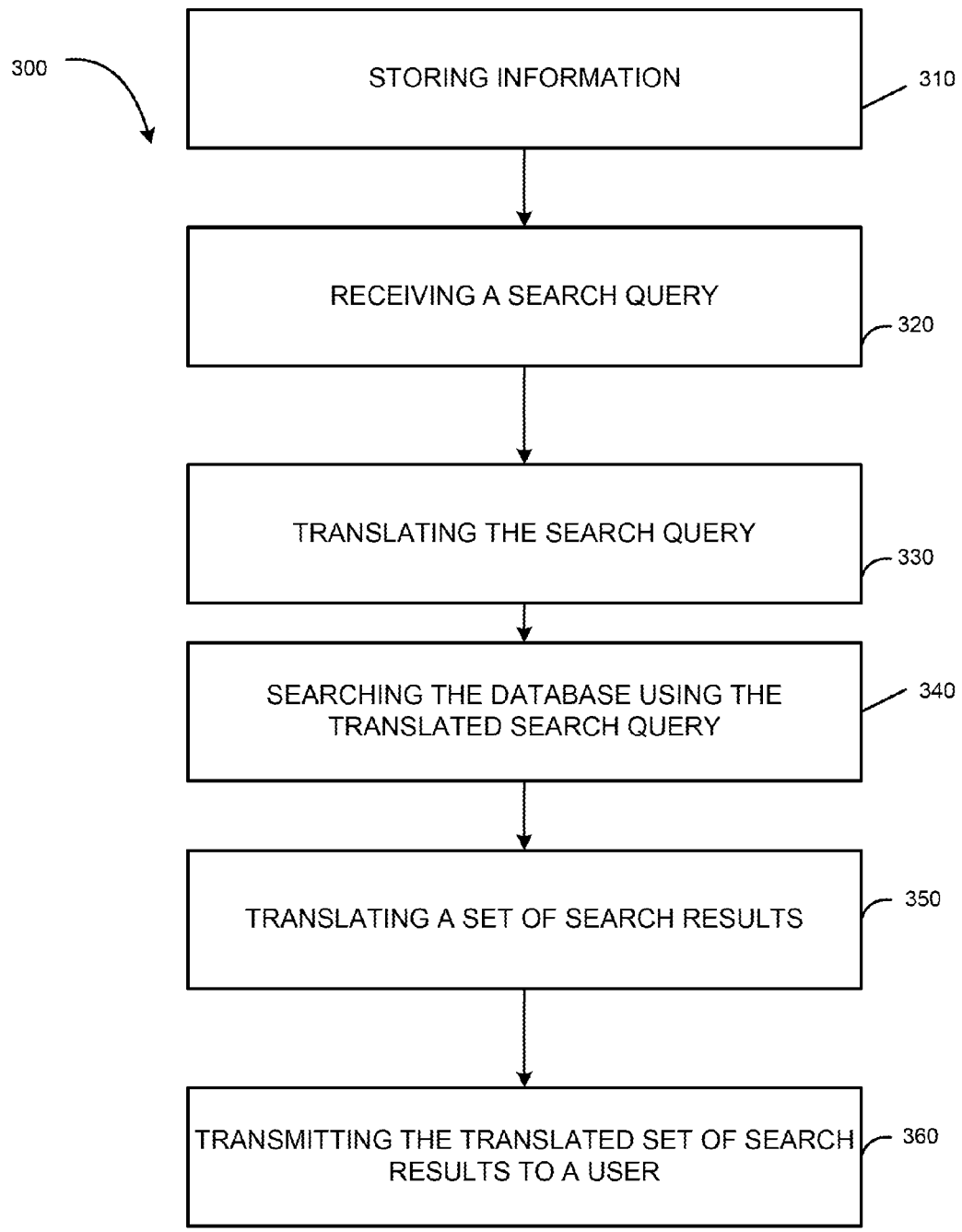

FIG. 3 is a flow chart illustrating another exemplary method 300 of using the computer system 100. In some implementations, a computer program product is tangibly embodied on a computer-readable medium and includes instructions that, when executed, are configured to cause at least one processor to implement the method 300.

The method 300 includes, first, at 310 storing information associated with applications, computer programs, or other items of digital media. In some implementations, a database is created to store the information. The stored information (e.g., the information within the database) includes information associated with applications, computer programs, or other digital media. The database can be formed or organized by receiving information associated with applications or computer programs by receiving the information from developers or distributors of the applications or computer programs. In some implementations, the information is stored in a first language, such as the language of the developer or the distributor of the applications or computer programs.

At 320, the method includes receiving a search query or request. In some implementations, the search request is received in a language other than the language in which the information is stored. For example, in some implementations, the search request is received in the native language of the user and that language differs from the language of the information of the database.

At 330, the search request is translated from the language in which the user provided the search request to the language of the database. At 340, the translated search request or query is used to search the database. The relevant applications or computer programs of the database are identified and a set of search results are produced. In some implementations, the set of search results includes a listing of title or other information of the relevant applications or computer programs that were identified in the search of the database.

In some implementations, the set of search results are in the language of the database. At 350, the set of search results are translated from the language of the database to the language in which the user placed the search request. At 360, the translated set of search results is provided to the user. For example, in some implementations, the translated set of search results are sent to the user over a network, such as a LAN or a WAN.

Figure 4:
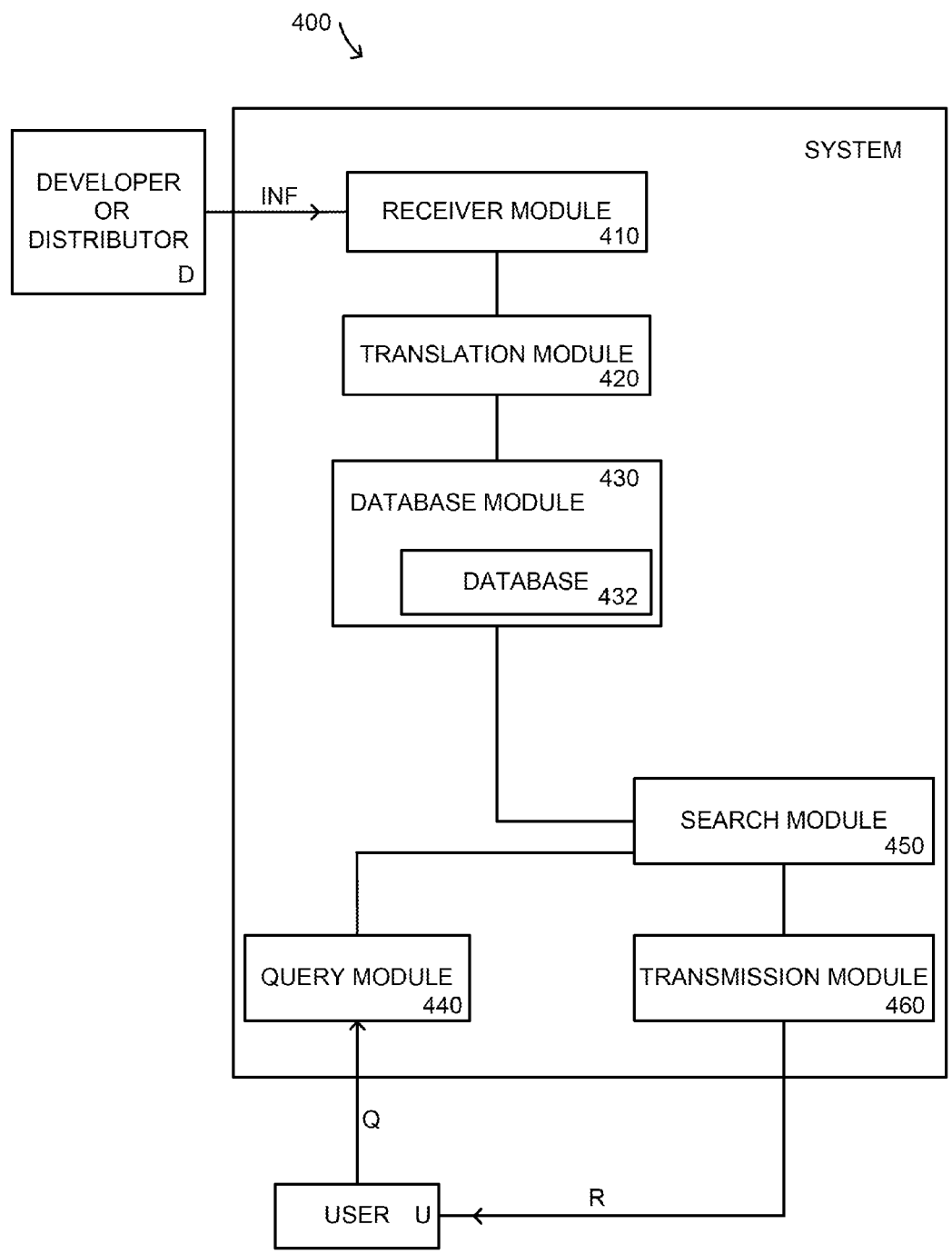
FIG. 4 is a block diagram of a system for providing an application market in multiple languages according to an implementation.

FIG. 4 is a block diagram of a computer system 400 for providing an application market in multiple languages. In other words, the market makes multiple or a plurality of applications or computer program products available to users or consumers. The system 400 may be used by users or consumers of a market to search for and locate computer applications, computer programs, or other items of digital media. For example, a user may search for and locate computer applications or computer programs that might be useful or entertaining to the user. In some implementations, the user may download or otherwise acquire the desired computer application or computer program. For example, in some implementations, the user, after searching for and locating a desired computer application or computer program, the user may pay a fee and download the computer application or computer program to a computing device of the user. In some implementations, the computing device is a handheld or mobile device such as a cellular phone. In other implementations, the computing device is a personal computer.

In the illustrated implementation, a user may search for and locate computer applications, computer programs, or other digital media in different languages. For example, in the illustrated implementation, a user may search for a computer application using key words in the native language of the user.

The system 400 may also be used by application and computer program developers (or other digital media providers) to provide applications and/or computer programs to the system for future location by users of the system. Specifically, in some implementations, a developer of an application or a computer program may provide information regarding an application or a computer program to the system for storage or inclusion a database for future reference and identification by a user of the system.

The system 400 includes a receiver module 410, a translation module 420, a database module 430, a query module 440, a search module 450, and a transmission module 460. In some implementations, one or more of the components or modules of the system 400 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed by a computer). In some implementations, the functionality of the modules or components can be included in different modules and/or components than those shown in FIG. 4.

The receiver module 410 is configured to receive information associated with applications, computer programs, or other items of digital media. For example, in the illustrated implementation, the receiver module 410 is configured to receive information associated with applications or computer programs INF from a developer or distributor D of the applications or computer programs. In some implementations, the receiver module 410 is configured to receive information associated applications or computer programs in any language. For example, in some implementations, the receiver module 410 is configured to receive information associated applications or computer programs in English or the native language of the developer of the application or computer program.

Figure 5:
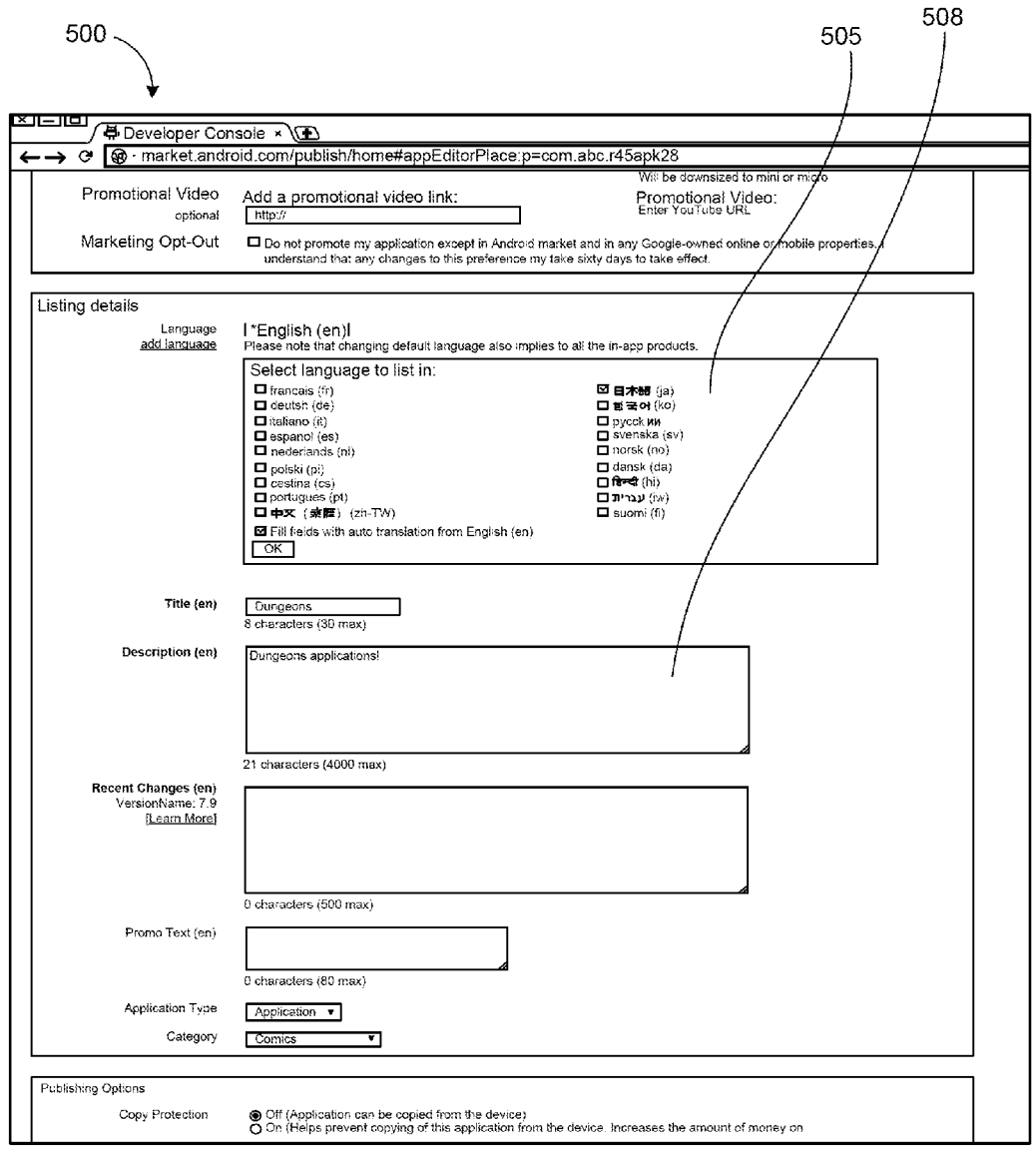
FIG. 5 is a screen shot of a developer entry form according to an implementation.

FIG. 5 is a screen shot 500 of an entry form for a developer or distributor of an application or computer program. The developer or distributor may the selection box 505 indicate or select the languages into which the information associated with the application or computer program should be translated into. Additionally, the developer or distributor may use input boxes 508 to provide the information (the metadata), such as the title, a description, a version, promotional text, and category of the application or computer program.

The receiver module 410 is operatively coupled to the translation module 420. The translation module 420 is configured to translate the information received by the receiver module 410 from the language in which the information was received by the receiver module 410 to a different language. For example, if the information is received by the receiver module 410 in English, the translation module may be configured to translate the information into Chinese, Japanese, or Spanish.

In some implementations, the translation module 420 is configured to translate the information received by the receiver module 410 from the language in which the information was received by the receiver module 410 to a plurality of languages that are different than the language in which the information was received. For example, if the information is received in English, the translation module 420 may be configured to translate the information into, for example, but not limited to, Chinese, Japanese, and Spanish.

In some implementations, the translation module 420 is configured to translate the information received by the receiver module 410 from the language in which the information was received by the receiver module 410 to selected languages. In some implementations, the translation module 420 is configured to identify one or more languages into which the information associated with the application or computer program and received by the receiver module 410 should be translated into. For example, in some implementations, a default rule may be set such that the translation module 420 always translates the information into a few selected languages. In other implementations, the developer or distributor D of the applications or computer programs selects the languages into which the information associated with the application or computer program product should be translated. In such implementations, the developer or distributor D may be provided an opportunity to select or identify the languages into which the information is translated (as illustrated in FIG. 5). For example, in some implementations, the developer or distributor D of the applications or computer programs is queried as to which languages the developer or distributor D would like to have the information translated into at the time the developer or distributor D of the applications or computer program products uploads or provides the information to the receiver module 410.

In some implementations, the translation module 420 utilizes a computing system to translate the information associated with the application or computer program into the various other languages. For example, a computing system having one or more processors and a memory may be used. In other implementations, the translation module 420 is configured to utilize publicly available resources to facilitate the translation of the information. For example, in some implementations, the translation module 420 is configured to utilize a resource that is publicly available via the Internet to translate the information from the language in which it was received to different languages.

The translation module 420 is operatively coupled to the database module 430. The database module 430 includes a database 432 and is configured to store the information associated with the applications, computer programs, or other items of digital media. Specifically, in some implementations, the database module 430 is configured to store and organize the information associated with the applications or computer programs in the language as received by the receiving module 410 and the language as translated by the translation module 420. In other words, the database module 430 is configured to store the information associated with the applications or computer programs in a plurality of languages.

The query module 440 of the system 400 is configured to receive a search request or query Q from a user U. For example, in some implementations, a user U may provide a search request or query Q to the query module 440 to receive a listing of applications or computer programs that may be of interest to the user.

In some implementations, the query module 440 is configured to receive the search request or query from a user U via a network connection, such as a local area network (LAN) or a wide area network (WAN), e.g., the Internet. In other implementations, the query module 440 is configured to receive the search request or query from the user U via another mechanism. For example, in some implementations, the query module 440 may interact with the user via a graphical user interface in which the user may input the search request or query Q.

In some implementations, the query module 440 is configured to receive the query from the user U in a first language, such as a language native to the user U. In some implementation, the language in which the user U provides the query Q is different than the language in which the information associated with the application or computer program INF was provided to the receiver module 410.

The query module 440 is operatively coupled to the search module 450. The search module 450 is configured to search the database 432 and identify potentially relevant applications, computer programs, or other items of digital media based on the query Q received by the user U. In some implementations, the search module 450 is configured to recognize the language of the query Q and to search the portion of the database 432 that is in the language of the query Q.

In some implementations, the search module 450 is configured to filter the search results prior to providing the results to the user U (via the transmission module 460 as described below). The filtering of the search results may allow the system 400 to provide the best results (or the most likely to be what the user U is looking for) to the user U.

In some implementations, the system 400 allows the user U to browse the market. In such implementations, the system 400 provides the user U the information about the various applications or computer programs in a language familiar to the user U.

The search module 450 is operatively coupled to the transmission module 460. The transmission module 460 is configured to transmit the set of search results R produced by the search module 450 to the user U. In some implementations, the transmission module 460 is configured to transmit the set of search results in the language of the query Q. In other implementations, the transmission module 460 is configured to transmit the set of search results in a language that differs from the language of the query Q.

In some implementations, the transmission module 460 is configured to transmit the set of search results R to the user U via a network connection, such as a local area network (LAN) or a wide area network (WAN), e.g., the Internet. In other implementations, the transmission module 460 is configured to transmit the set of search results R to the user U via another mechanism.

Figure 6:
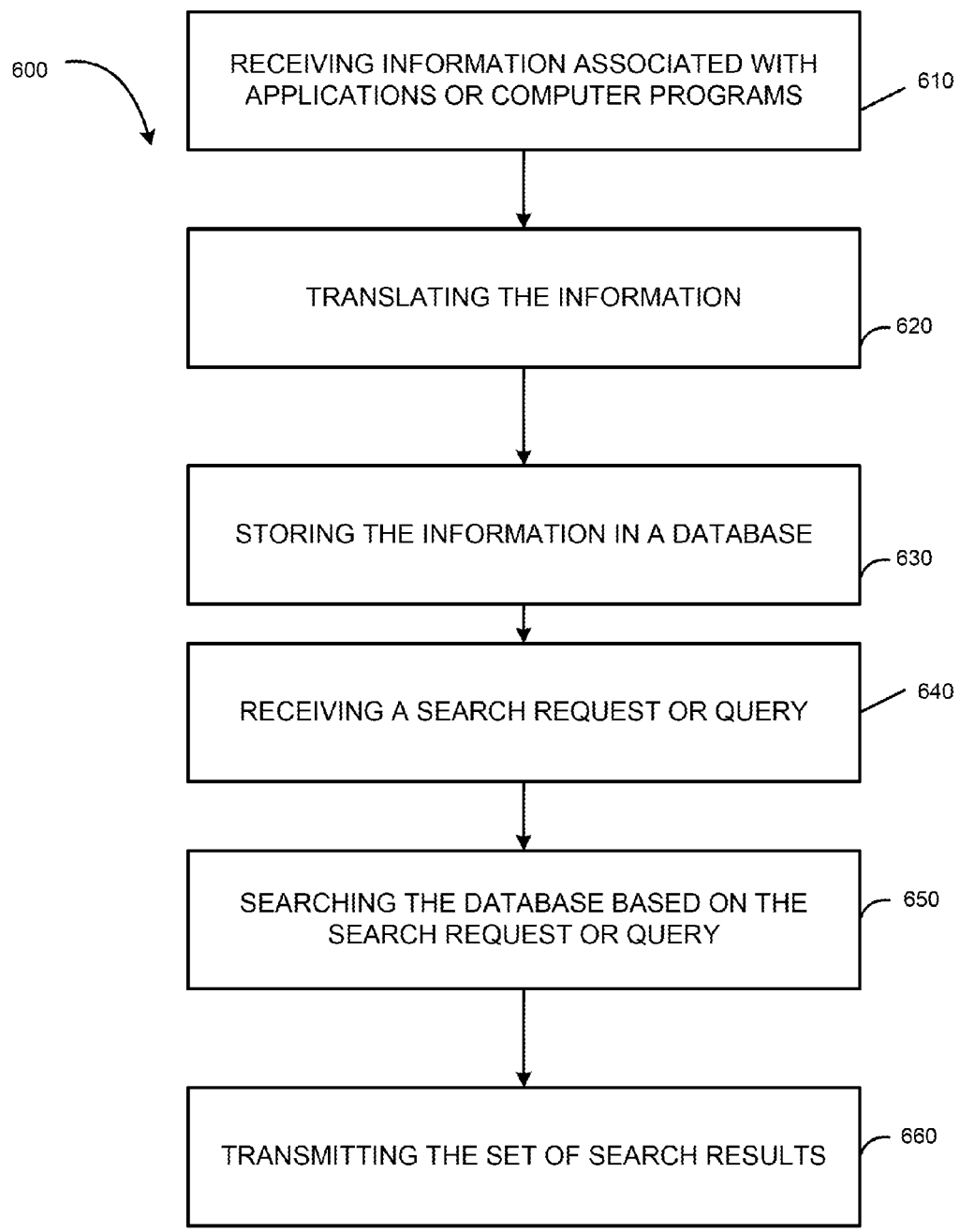
FIG. 6 is a flowchart illustrating example operations of the system of FIG. 4.

In some implementations, the system 400 also functions as a market and is configured to sell or vend a particular application or computer product to the user. For example, in some implementations, the system 400 is configured to receive a selection of an application from a user, receive a fee from the user, and transmit or otherwise provide the application or computer program to the user. In some implementations, the system 400 is configured to track and store the sales or distribution information of the particular applications or computer programs. FIG. 6 is a flow chart illustrating another exemplary method 600 of using the computer system 400. In some implementations, a computer program product is tangibly embodied on a computer-readable medium and includes instructions, that when executed, are configured to cause at least one processor to implement the method 500.

The method 600 includes, at 610 receiving information associated with an application, a computer program, or other item of digital media. The information may be received in any language.

At 620, the information is translated from the language as received at 610 to a language that differs from the language in which the information was received. For example, in some implementations, the information is translated into a plurality of different languages.

At 630, the information is stored, for example, in a database. In some implementations, the information associated with the digital media, such as applications and computer programs, is stored in a plurality of languages. For example, in some implementations, the information is stored in the language in which it was provided in 610 and in the languages into which the information was translated in 620.

At 640, the search request or query is received from a user. For example, in some implementations, the search request or query is received via a LAN or a WAN. In some implementations, the search request or query is received in language that is native to the user.

At 650, the database of information is searched based on the search request or query. For example, in some implementations, the language of the search request or query is identified and the portion of the database in that language is searched to identify applications or computer programs that are relevant to the search request or query.

At 660, the set of search results is transmitted to the user. In some implementations, the set of search results are transmitted to the user in a preferred language of the user. For example, in some implementations, the set of search results is transmitted to the user in the language in which the search request or query was provided by the user. In some implementations, the translated set of search results are sent to the user over a network, such as a LAN or a WAN.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method, comprising:
   receiving, at a processor, first information associated with an application that is to be, included in an online marketplace that makes multiple applications available, wherein the first information is in a first language;
   identifying one or more second languages into which the first information is to be translated, wherein the one or more second languages are identified based upon a default rule or a prior selection, and wherein each of the one or more second languages is different from the first language;
   translating the first information into second information in the one or more second languages; and
   storing the second information in a manner such that the second information is associated with the application that is to be included in the online market.

2. The method of claim 1, wherein the first information associated with the application includes metadata.

3. The method of claim 1, wherein the first information associated with the application includes at least one of a title, a description, a version, and a promotional text of the application.

4. The method of claim 1, wherein a developer or distributor of the application provides the prior selection.

5. The method of claim 1, further comprising:
   receiving a request to browse the market in one of the second languages; and
   displaying the second information.

6. The method of claim 1, further comprising:
   receiving a search request in one of the second languages;
   searching the second information based on the search request;
   providing the results of the searching in the one of the second languages.

7. The method of claim 6, further comprising:
   detecting the one of the second languages.

8. A computer system comprising:
   a receiver module configured to receive information associated with each of a plurality of applications, respective applications of the plurality of applications to be included in an online marketplace that makes multiple applications available, the information associated with representative applications of the plurality of applications being in a first language;
   a translation module configured to translate the information associated with representative applications of the plurality of applications from the first language to a second language different than the first language;
   a database module configured to store the information associated with the plurality of applications in the first language in a database and to store the information associated with the plurality of applications in the second language in the database;
   a query module configured to receive a search request in the second language;
   a search module configured to search the database to produce a set of search results responsive to the search request; and
   a transmission module configured to transmit the set of search results.

9. The computer system of claim 8, wherein the transmission module is configured to transmit the set of search results in the second language.

10. The computer system of claim 8, wherein the translation module is configured to translate the information associated with representative applications of the plurality of application from the first language to a third language different than the first language and different than the second language.

11. The computer system of claim 8, wherein the translation module is configured to translate the information associated with representative applications of the plurality of application from the first language to a third language different than the first language and different than the second language, the query module is configured to receive a search request in the third language, and the transmission module is configured to transmit the set of search results in the third language.

12. The computer system of claim 8, wherein the information associated with each of a plurality of applications includes a title for representative applications of the plurality of applications.

13. The computer system of claim 8, wherein the information associated with each of a plurality of applications includes a title and description of representative applications of the plurality of applications.

14. A non-transitory computer-readable medium having stored therein instructions that, when executed by a computing device cause the computing device to perform functions comprising:
   receiving information associated with a plurality of applications in a first language, respective applications of the plurality of applications to be included in an online marketplace that makes multiple applications available;
   translating the information associated with the plurality of applications from the first language to a second language different than the first language;
   storing, in a database, the information associated with the plurality of applications in the first language;
   storing, in the database, the information associated with the plurality of applications in the second language;
   receiving a search request in the second language;
   searching the database to produce a set of search results responsive to the search request; and
   transmitting the set of search results.

15. The non-transitory computer-readable medium of claim 14, wherein the information associated with the plurality of applications includes a title for each of the plurality of applications.

16. The non-transitory computer-readable medium of claim 14, wherein the information associated with the plurality of applications includes a title and a description for each of the plurality of applications.

17. The non-transitory computer-readable medium of claim 14, wherein the instructions are further executable by the computing device to perform functions comprising:
   translating the information associated with the plurality of applications from the first language to a third language different than the first language and different from the second language.

18. The non-transitory computer-readable medium of claim 14, wherein the instructions are further executable by the computing device to perform functions comprising:
   receiving an identification of the second language from a user.

19. The non-transitory computer-readable medium of claim 14, wherein the instructions are further executable by the computing device to perform functions comprising:
   translating the information associated with the plurality of applications from the first language to a third language different than the first language and different from the second language; and
   receiving an identification of the second language and the third language from a user.

20. The non-transitory computer-readable medium of claim 14, wherein the set of search results are transmitted in the second language.

21. A computer system comprising:
   a database module configured to receive and store information associated with a plurality of items of digital media in a database, respective items of digital media of the plurality of items of digital media to be included in an online marketplace that makes digital media available, the information associated with the plurality of items of digital media being stored in a first language;
   a query module configured to receive a search request for a subset of the items of digital media, the search request being received in a second language different than the first language;
   a translation module configured to translate the search request from the second language into the first language;
   a search module configured to search the database using the translated search request to produce a set of search results responsive to the search request; and
   a transmission module configured to transmit the set of search results.

22. The computer system of claim 21, wherein the database module includes a receiver module configured to receive information associated with a respective item of digital media of the plurality of items of digital media.

23. The computer system of claim 21, wherein the database module includes a receiver module configured to receive information associated with a first item of digital media and an aggregator module configured to add the information associated with the first item of digital media to the database.

24. The computer system of claim 21, wherein the transmission module includes a translation module configured to translate the results of the search of the database from the first language to the second language.

25. The computer system of claim 21, wherein the query module is configured to receive a search request in a third language different than the second language and different than the first language, and wherein the translation module is configured to translate the search request from the third language into the first language.

* * * * *